(12) United States Patent
Huber

(10) Patent No.: US 9,951,828 B2
(45) Date of Patent: Apr. 24, 2018

(54) UNIDIRECTIONAL TORQUE COUPLING AND METHOD OF USE

(71) Applicant: Ulrich Fahl, Buggingen (DE)

(72) Inventor: Friedhelm Huber, Muellheim (DE)

(73) Assignee: Ulrich Fahl, Buggingen (DE)

( * ) Notice: Subject to any disclaimer, the term of this patent is extended or adjusted under 35 U.S.C. 154(b) by 0 days.

(21) Appl. No.: 14/732,480

(22) Filed: Jun. 5, 2015

(65) Prior Publication Data
US 2015/0354641 A1 Dec. 10, 2015

(30) Foreign Application Priority Data

Jun. 6, 2014 (DE) .................. 10 2014 108 087

(51) Int. Cl.
| | | |
|---|---|---|
| *F16D 41/00* | (2006.01) | |
| *F16D 41/22* | (2006.01) | |
| *F16D 41/32* | (2006.01) | |
| *F16D 41/18* | (2006.01) | |
| *F16D 41/36* | (2006.01) | |
| *F16D 43/202* | (2006.01) | |
| *F16D 13/04* | (2006.01) | |

(52) U.S. Cl.
CPC ........... *F16D 41/32* (2013.01); *F16D 41/185* (2013.01); *F16D 41/22* (2013.01); *F16D 41/36* (2013.01); *F16D 43/2024* (2013.01); *F16D 13/04* (2013.01)

(58) Field of Classification Search
CPC ............................ F16C 41/28; F16C 41/063
See application file for complete search history.

(56) References Cited

U.S. PATENT DOCUMENTS

| | | | | |
|---|---|---|---|---|
| 710,759 | A * | 10/1902 | Coleman | B66D 5/00 188/134 |
| 939,663 | A * | 11/1909 | Cameron | F16D 13/28 192/70.15 |
| 1,849,212 | A | 3/1932 | Winther | |
| 2,308,681 | A * | 1/1943 | Eason | F16D 13/04 192/111.11 |

(Continued)

FOREIGN PATENT DOCUMENTS

| | | |
|---|---|---|
| AT | 363221 B | 7/1981 |
| DE | 1295291 A | 5/1969 |

(Continued)

OTHER PUBLICATIONS

EP15170925 European Search Report dated May 12, 2016.

*Primary Examiner* — Robert W Hodge
*Assistant Examiner* — Ryan P Dodd
(74) *Attorney, Agent, or Firm* — Wagenknecht IP Law Group PC

(57) ABSTRACT

A torque coupling comprising a drive body, an output side body which is coaxially arranged, a pressure disk which is coaxially arranged, movable in rotation coaxial direction, and having a first torque transmission surface on its face side, and a torque transmission device. The torque transmission device (5) comprises rigid pressure transfer elements (6) loadable by compressive forces only upon a gripping of the non driven by the driven torque transmission surface which points in drive direction (A), thereby moving in rotation coaxial direction contrary to the pressure disk (3), and pressing the same in direction of the second torque transmission surface (4B).

9 Claims, 3 Drawing Sheets

(56) References Cited

U.S. PATENT DOCUMENTS

| | | | | |
|---|---|---|---|---|
| 2,351,996 A | * | 6/1944 | Porters | F16D 41/22 |
| | | | | 192/33 R |
| 2,811,234 A | * | 10/1957 | Matrau | F16D 13/04 |
| | | | | 188/72.2 |
| 2,976,974 A | * | 3/1961 | Blyth | F16D 23/10 |
| | | | | 192/35 |
| 4,550,817 A | * | 11/1985 | Euler | F16D 13/38 |
| | | | | 192/70.23 |
| 5,515,957 A | | 5/1996 | McConaghy | |
| 2007/0272507 A1 | * | 11/2007 | Smith | F16D 23/12 |
| | | | | 192/35 |
| 2012/0103743 A1 | | 5/2012 | Hong | |
| 2014/0021001 A1 | * | 1/2014 | Steinwender | F16D 27/115 |
| | | | | 192/70.11 |

FOREIGN PATENT DOCUMENTS

| | | |
|---|---|---|
| DE | 1575866 A1 | 1/1970 |
| DE | 1600051 A | 2/1970 |
| DE | 202004015321 U1 | 1/2005 |
| DE | 102010033272 A1 | 2/2012 |
| DE | 202011108822 U1 | 4/2012 |
| DE | 102011110199 A1 | 2/2013 |
| EP | 2594411 A1 | 5/2013 |
| JP | 2000230575 A | 8/2000 |

\* cited by examiner

UNIDIRECTIONAL TORQUE COUPLING AND METHOD OF USE

TECHNICAL FIELD

The invention relates to a unidirectional torque coupling and a method for its operation. In particular, the invention relates to such a coupling with improved characteristics.

BACKGROUND OF THE INVENTION

Unidirectional torque couplings transmit torques in only one rotational direction, and thus do not transmit (or transmit significantly less torque) in the opposite rotational direction, thereby providing a so called "freewheel". Such apparatuses are typically used in drive technology, such as those with non permanently driven two-wheeled vehicles. While in the drive phase, the drive force, which is provided by means of muscles or a motor, is transmitted by use of a coupling from the drive to the wheel; the wheel being able to rotate freely in phases without (or without sufficient) drive, and the wheel being decoupled from the still standing or only slower rotating drive ("coasting").

In two wheel vehicle technology, such apparatuses are often simply called a "freewheel". In bicycles, they are typically mounted in the rear wheel hub. They allow transmitting drive forces provided from a foot pedal over the chain and onto the hub, as long as the angular velocity of the rear sprocket is equal to the angular velocity of the hub (and therefore, of the rear wheel). This equality is achieved in the drive direction by a mechanical, form-closed and/or frictional coupling between rear sprocket and hub. If, on the other hand, the angular velocity of the rear sprocket is slower than the angular velocity of the hub, the hub can rotate freely without being braked by the sprocket or further drive train components which are connected to it, respectively.

For the transmission of torque from the rear sprocket onto the hub, spur-cut freewheel disks are used. These have a saw tooth profile and are pressed against each other by means of a spring or a magnetic force. One of the freewheel disks is connected to the drive (rear sprocket), and the other is connected to the output (hub). In the drive direction, both freewheel disks interlock, such that the torque can be transmitted from one disk to the other, and thus, from the drive to the output. Contrary to the drive direction, one of the freewheel disks, which is axially moveable, is pressed away by the saw tooth profile from the other free wheel disk such that it slips, thereby preventing the continued transmission of torque. Often, this slipping is associated with an acoustically well perceptible clicking.

The axially moveable freewheel disk is often equipped with a spline profile at its circumferential external surface. It's gears form-lock with an accordingly designed toothing of the inside of the hub body. A tilting and thus cocking of the moveable freewheel disk must be avoided, just as the introduction of particles onto the spline profile, since this could otherwise result in a jamming of the free wheel disk. Thus, the repeated axial movement produces abrasion in the spline profile which on one hand continuously increases the clearance, and which can contribute to a contamination caused failure on the other. Further, the safe operation is also influenced by an ingress of dirt from the outside, as well as by the temperature variable viscosity of the imperatively necessary lubricant.

The contact force of both tooth-locking disks is exclusively provided by the above mentioned springs and/or by magnetic force. If it is too high, this results in an unnecessary high friction and thus an increased abrasion of the slipping freewheel, together with an often unpleasantly loud noise emission. If it is too weak, the result can be an undesired slipping of the toothing in the drive direction. Because of the continuous aging of the freewheel, it can suddenly slip in the drive direction and be rendered useless after only a few years of normal operation. Therefore, injuries of the driver due to such a defect are not unlikely. In order to minimize the danger of such a defect, the saw tooth profile is manufactured with a slight undercut which is complicated to produce, so that the toothings pull themselves against each other when the coupling is in the drive phase.

SUMMARY OF THE INVENTION

The object of the invention is to avoid the aforementioned disadvantages known from the art.

Thus, the invention provides a unidirectional torque coupling which does not have the disadvantages which come along with the usage of a spline profile, which is arranged at the circumferential external surface, for the purpose of torque transmission of an axially moveable freewheel disk.

Also, the invention provides improved safety against slipping contrary to the drive direction, and the reduction of wear or any wear induced functional impairment.

The unidirectional torque coupling (in the following, also "coupling" in short) is in principle universally usable; however, it can be used in particular for vehicles with a non-permanent drive (bicycle, motorcycle), where drive and roll phases alternate. The coupling serves for transmitting a drive torque which is provided in a drive direction (e.g. onto a wheel), but when provided contrary to the drive direction, no torque (or only a small, (e.g. gripping) torque which is not usable for drive purposes) is transmitted.

The coupling includes a drive body providing the drive torque, having an axis of rotation around which the body is rotatably supported.

It also includes an output side body which is arranged coaxially to the axis of rotation, and onto which the drive torque is transmissible. In other words, drive and output side body are located on the same axis of rotation, and a torque which acts in the drive direction is transmitted from the drive body onto the output side body.

The coupling also includes a pressure disk which is arranged coaxially to the axis of rotation. It is movable in a rotational axial direction, and has a first torque transmission surface on its face side being arranged for transmission of the drive torque.

The coupling also has a torque transmission device which is either arranged between pressure disk and output side body, or between pressure disk and drive body, and by means of which the drive torque can be transferred. It is clear that the torque transmission device must be dimensioned such that it can actually transfer the drive torque without being damaged.

Depending on the constructional variant, the coupling couples two different components with each other. If it is designed as an element which connects the pressure disk with the output side body, it serves for transferring the torque which is transmitted (in the drive case) from the drive body to the first torque transmission surface of the pressure disk, and which is present thereon, to the output side body (first constructional variant). If it is designed as an element which connects the drive body with the pressure disk, it serves for transferring the torque which is (also in the drive case) present at the drive body onto the pressure disk, from whose first torque transmission surface it can be transmitted to the output side body (second constructional variant). "Transferring" thus always means the force flow within the torque transferring device, whereas "transmitting" always denotes a force flow which involves the first torque transmission surface (and thus, the pressure disk) and the body which interacts with it (i.e. the drive or the output side body, depending on the constructional variant, see below).

In order for the drive torque to be transmissible, the component which is positioned in a rotationally-axial direction with its face side opposite to the first torque transmission surface of the pressure disk (this can be, depending on the constructional variant, the drive or the output side body) has a second torque transmission surface. The latter is permanently in mechanical contact with the first torque transmission surface, such that the non-driven torque transmission surface can be gripped by the driven torque transmission surface by way of form-closing and/or frictional resistance. Only upon exceeding a minimal contact pressure, the drive torque can actually be transmitted. If the minimal contact pressure is not reached, the driven torque transmission surface grips the non driven one, but the drive torque can not be transmitted, and the coupling "slips".

According to the invention, the torque transmission device is characterized in that it has dimensionally stable (rigid) pressure transfer elements. On one hand, these rest against the side of the pressure disk which is opposite to the first torque transmission surface ("back side" of the pressure disk). On the other hand, they also rest against the component which is opposite to this (back-)side; this component is, depending on the constructional variant, the drive or the output side body. Thus, the pressure transferring devices abut against the pressure disk and the component which is positioned as described before. The pressure disk is mechanically connected with its back side by means of the pressure transferring devices with the component onto which it transfers the drive torque, or from which the drive torque is transferred onto the pressure disk, respectively. The transmission is possible because of their dimensional stability; a non rigid body such as in particular a spring would therefore not be suitable for this purpose.

According to the invention, the pressure transfer elements are loaded by compressive forces only upon a gripping of the non driven (first) by the driven (second) torque transmission surface, which is affected by form locking of or frictional resistance between the torque transmission surfaces, and which is firstly only a minor, then a full gripping, pointing in drive direction (in the drive case), wherein these forces do not result in (or only insignificant) deformation of the pressure transfer elements. In other words, the pressure transfer elements are loaded with compressive forces only in the drive phase. The compressive forces result from the drive torque, the radial distance of the pressure transfer elements from the rotation axis, as well as the position and shape of the pressure transfer elements. Accordingly, the pressure transfer elements are positioned in a way that they (or their centers of gravities, respectively) move upon compressive loads (at least also) in a rotational coaxial direction contrary to the pressure disk (e.g. tilting), that they erect themselves, thus exerting an infeed motion onto the pressure disk which acts in direction of the second torque transmission surface.

Typically, (as viewed in the axial direction) a tangential and/or radial motion of the center of gravity is superimposed to this coaxial motion. This means that the center of gravity of a pressure transfer element is displaced by means of erecting away from the rotation axis to the outside (radially), and/or along an arc of a circle which is coaxial with the the rotation axis (tangentially), depending on the orientation of the longitudinal axis of the pressure transfer element.

Because of the erecting and feeding inward (their motion contrary to the pressure disk), the pressure transfer elements press the pressure disk in the direction of the second torque transmission surface while providing a coaxially acting force. The erecting and feeding inward is possible because the pressure transfer elements are substantially nondeformable and rest against a component which is in turn rotationally coaxially fixed, so that they cannot move in its direction or past it, respectively.

The coaxially acting force is of a magnitude so high that the above mentioned minimal contact pressure is reached or exceeded and the (full) drive torque is transmissible; the coupling "takes up". On the other hand, upon a force contrary to the drive direction (freewheel case), the pressure transfer elements—once again without any significant change in shape—are relieved, so that they move away from the pressure disk and the minimal contact pressure is no longer met, and so that no more drive torque is transmissible, and thus the drive body substantially rotates free with respect to the output side body.

Thus, the coupling dispenses with a spline or comparable outside profile known from the art, because torque transfer is effected by means of the torque transmission device, and in particular, by its pressure transfer elements. These only slightly erect upon engagement which results in only negligible friction and accordingly little wear in the torque transmission device. The actual force transmission of the drive torque is effected via the two torque transmission surfaces which provide a significantly larger area compared to latching pawls, so that wear is minimized. The height of individual teeth which are preferably used for transmission can be smaller with respect to latching pawls because of this larger area which is available for transmission, resulting in a lower working stroke and thus, in a faster response of the coupling. An undercut is no longer mandatory since the axial compressive force which can be provided by the pressure transfer elements can be so high that even torque transmission surfaces without undercuts and even without the teeth which are known from freewheels can be used for torque transmission.

According to one embodiment of the torque coupling, the pressure transfer elements are designed as push rods. Push rods are typically oblong components with two ends.

With respect to the above described first constructional variant, the push rods rest against the back side of the pressure disk with a drive side end, and against the output side body with an output side end.

With respect to the above described second constructional variant, the push rods rest against the drive with a drive side end, and against the back side of the pressure disk with an output side end.

Always in the drive state, and preferably in the drive as well as in the freewheel state, the push rods are inclined with their "pitch line" in an erecting angle contrary to the drive direction. This means that at least in the drives state, a certain inclination of the pitch lines is present which must not be present during the freewheel state, but which automatically sets itself during the transition from the freewheel to the drive state. This can e.g. be effected by means of springs or the same, as discussed in detail further below.

In other words with regard to the case of the first constructional variant, at least in the drive case, the push rods have in a rotational axial direction, measured from the pressure disk, a smaller distance to the pressure disk on the drive side than on the output side. The pitch line can be regarded as an imaginary line along which the axis of the push rod would run if it would be indefinitely thin and have indefinitely small ends. For an axially symmetric designed push rod, the pitch line runs just through the longitudinal axis of the push rod. As a result, there exists a positive erecting angle between the longitudinal axis of the pitch line and the pressure disk as well as the output side body (first constructional variant), or the drive body (second constructional variant), respectively.

As a result of this inclination, this erecting angle of the push rods further increases upon compressive load due to the permanently present inclination (=erecting); thus, the push rods press the pressure disk in direction of the component which has the second torque transmission surface. In this manner, the contact pressure of both torque transmission surfaces increases more and more, until the minimal contact pressure, from which a transmission of the drive torque by means of the both torque transmission surfaces is possible, is reached or exceeded.

It is clear that the erecting angle and the geometry of the push rods are adapted to each other such that the resulting stroke is at least slightly larger than the teeth height of a possibly present spur gearing of the torque transmission surfaces. In the case of a frictional torque transmission, the stroke can be even smaller.

The push rods can also be designed as small plates which can also erect themselves, but which have larger areas at the ends than bar shaped push rods. Such small plates provide a "pitch plane" instead of a pitch line. It is clear that the small plates can have a rounded shape at one or both edges in order to provide the maximal mating surface in every position.

It is clear that the push rods do not require a linear and/or symmetric shape. They must only have a shape which can change between a more lying position and a more erected position, wherein this shape has, viewed in rotational axial direction, a smaller dimension in the lying position than in the erected position. Thus, only spheres are not suitable for this embodiment, since they do not have a pitch line.

Particularly preferred, the push rods have a ball head at their drive side end and/or at their output side end. The ball head is not required to be symmetric with respect to the possibly present longitudinal axis of the respective push rod. The support area provided for the resting of the respective end has a suitable pocket (joint socket, ball socket) for housing this ball head. One of the support areas is always arranged at the back side of the pressure disk; and the other support area is situated with its face side at the component which is located opposite to this back side, i.e. either the output side body or the drive body.

In this way, the push rods are joined or at least joinable in a ball joint manner with the component which provides the first and/or second torque transmission surface. Depending on the design and support of the ball joint, it can carry not only compressive forces, but it also secures the push rod against lifting off from the joint socket which is present in the support area. Thus, one unit is formed which firmly connects the pressure disk with the component which is located opposite to its back side. A free rotation of the pressure disk relative to the component which it is attached to is not possible. In particular, these two bodies are only slightly rotatable against each other (e.g. a few degrees). The erecting which is effected by a relative rotation is stopped when both torque transmission surfaces rest against each other. The shorter the possible stroke, the smaller the relative remaining rotatability.

Instead of a ball joint, a cardan joint or a swivel joint (hinge) can be used as well.

Naturally, the stroke is also influenced by the above described erecting angle; a pressure transfer element with a most possible flat running pitch line will erect itself faster or, with the same rotation angle, further up than one with an already rather steep running pitch line. In the borderline case of an erecting angle of 90 degrees, no further erecting takes place; thus, this borderline case must therefore always be avoided.

A preferred erecting angle amounts to less than approx. 10 degrees in the freewheel case, and not more than approx. 30 degrees in the drive case. Particularly preferred is an erecting angle of less than approx. 5 degrees in the freewheel case, and of not more than approx. 10 degrees in the drive case. Most preferred is an erecting angle of less than approx. 3 degrees in the freewheel case, and of not more than approx. 6 degrees in the drive case.

According to a further embodiment, the output side body is designed fixedly joinable with the hub body of a wheel hub, and/or the drive body is designed being fixedly joinable with the freewheel body of a wheel hub. In other words, the drive or the output side body are designed as a ring which can be screwed in, and which can be inserted in, and fixed to, the hub or freewheel body of a wheel hub, respectively. The advantage of this embodiment is that the torque coupling according to the invention can be fabricated separately and then be subsequently installed with no or only little reworking into a preferably commercially available wheel hub.

According to another embodiment, the output side body is designed as the hub body of a wheel hub, and/or the drive body is designed as the freewheel body of a wheel hub. In other words, the drive or output side body, respectively, is integral with the freewheel or hub body, respectively, of the wheel hub. This embodiment has the advantage of less weight and needs less individual parts.

Basically, all surface structures which are known in the art and which are suitable for frictional resistance and/or formclosed transmission of torque can be considered as the torque transmission surfaces. For example, at least one of the two torque transmission surfaces has a spur gearing (axial gearing), whereby an undercut is possible, but not necessary. A symmetric or asymmetric wave profile can be used for the torque transmission as well. Eventually, at least one of the torque transmission surfaces can be designed as frictional surface, so that a frictional coupling is formed which can, upon reaching the above mentioned minimal contact pressure, transmit the drive torque.

As already mentioned further above, it must be ensured according to the invention that at least in the drive state a permanent mechanical contact of the two torque transmission surfaces is present. This can be effected by means of gravity, in that the rotation axis is approximately vertically oriented, and in that the first torque transmission surface is being positioned above the second one, so that both torque transmission surfaces rest onto each other.

However, for ensuring, an approaching means for approaching one torque transmission surface to another is preferably present. By means of one or several mechanical springs or by means of magnetic forces, the approaching means can exert little pressure onto the back side of the pressure disk which is sufficiently high for the approaching; such solutions are well known in the art. One or preferably several springs can be arranged between the back side of the pressure disk and the component which is opposite to this back side, being compressively loaded; instead of the springs, suitably polarized magnets can be used. It is also possible to use attracting magnets, provided that suitable mounting positions are used within or close to the torque transmission surfaces.

By use of an approaching means it is also possible to orient the pitch line of push rods flat, i.e. parallel to the rotation plane of the component which is arranged opposite to the pressure disk, in the freewheel case. Then, in the drive case, the approaching means makes sure that an erecting angle of more than 0 degrees is set, as long as the pressure disk which moves in rotation axial direction does grip the ends of the push rods that rest against the disk.

It is further possible that the ensuring is effected by means of centrifugal force, or by means of fluidic force. Fluidic forces are exerted by liquids which flow through channels in a suitable manner upon rotation, and which build up pressure which acts onto the pressure disk.

Subsequently, the method for operating a unidirectional torque coupling is also described. The torque coupling has a drive body (such as the freewheel of a wheel hub), an output side body (such as the hub body of a wheel hub), a pressure disk which is arranged rotationally and coaxially to both and which is movable in the combined direction, and a torque transmission device which is either arranged between pressure disk and output side body or between pressure disk and drive body and which respectively includes rigid pressure transfer elements. In order to avoid repetition, reference is made to the above explanations regarding the torque coupling according to the invention.

The drive case in which the drive torque shall be transmitted is firstly characterized in a relative rotation between drive body and output side body in drive direction. Upon this rotation which points in drive direction of at least the drive body, eventually, a taking up of the coupling takes place, so that, from the moment of this taking up, the relative rotation becomes zero, but never negative. In other words, the angular velocity of the drive body is greater than angular velocity of the output side body, which also rotates in drive direction until the coupling has been taken up and both angular velocities become equal due to the mechanical coupling.

According to the invention, the pressure transfer elements are loaded by compressive forces, so that their center of gravity moves contrary to the back side of the pressure disk, onto which they then exert pressure. In other words, due to the loading with compressive forces, the orientation and/or position of the pressure transfer elements, which rest against the back side of the pressure disk as well as against the component which is opposite to this back side, changes. The displacement of the center of gravity can be effected by a change in position or orientation, which will be discussed further below. Therein, typically, a radial and/or tangential displacement takes place as well; reference is made to the above explanations.

The motion contrary to the back side of the pressure disk results in a (at least also) rotational axial motion of the pressure disk in the direction of the drive body or the output side body, respectively; the rotating coaxial motion of the pressure disk is typically superimposed with a rotational motion of the same.

The motion eventually leads to a frictional and/or form-closed connection between a first torque transmission surface arranged at the pressure disk and a second torque transmission surface which is arranged at the drive body or at the output side body, respectively. By pressing the pressure disk with its first torque transmission surface against the second torque transmission surface which is, depending on the constructional variant, arranged either at the drive body, providing the drive torque, or at the output side body, serving for the "leading off" of the drive torque, the coupling is thus "engaged" and actuated.

As a consequence, the relative rotation becomes zero, the drive body drives the output side body via the pressure disk, and transmission of the drive torque from the drive body to the pressure disk, and from there, to the output side body, is the result. Therein, the pressure load onto the torque transmission devices is permanently kept up to ensure the permanent pressing of both torque transmission surfaces. In other words, the compressive load results in a change of position of the pressure transfer elements, eventually leading to a self-retention (cocking).

In contrary, the freewheeling case is characterized as a permanent relative rotation between drive body and output side body contrary to the drive direction. In other words, the difference between the angular velocity of the drive and output side body is non-zero and negative, i.e. points contrary to the drive direction. Rephrased, the drive body is stationary in relative terms, and only the output side body rotates contrary to the drive direction.

The pressure transfer elements are pressure relieved in the freewheeling case, so that their center of gravity moves away from the back side of the pressure disk, such that they no longer exert pressure onto the same; if applicable, a radial and/or tangential displacement is also reversed. This in turn results in a rotational axial increase of the distance between the pressure disk and the drive body or the output side body, respectively, resulting in a release of the connection between the first and second torque transmission surfaces. The form-closed and/or frictional resistance connection is separated; at least so much that the drive torque can not be transmitted any more. A gripping torque can still be transmissible, as long as both torque transmission devices touch each other without significant pressure. Thus, contrary to the drive direction, no drive torque is transmitted from the drive body to the output side body, but drive and output side body substantially rotate free with respect to each other.

According to one embodiment, the motion of the centers of gravity of the pressure transfer elements is effected in that the pressure transfer elements have a longitudinal, i.e. at least non-spherical, shape with a "pitch line". They can have the shape of oblong push rods, and thus reference is made to the above explanations in this matter. Further, the push rods are, viewed in drive direction, fixed to the back of the pressure disk as well as to the component which is opposite to this back side. This means that the pressure transfer elements result in a cocking between drive body and output side body upon a relative rotation which points in drive direction, such that eventually, both bodies can not rotate against one another any more. Since the pressure transfer elements have an oblong shape and are supported in drive direction, they erect upon compressive loads and require more space in rotational axial direction. It is clear that the pressure transfer elements are preferably (pre-)inclined such that they further erect upon compressive loads. If their "pitch line" would run parallel to the back side of the pressure disk, they would still carry compressive loads, but they would not try to erect themselves. Thus, at least a little erecting angle must be present between their pitch line and the pressure disk at any time which further increases upon compressive loads. Alternatively, an approaching means must be provided which makes sure that said erecting angle is present at least in the drive case, and thus here as well reference is made to the above explanations.

In the case of only a radially running pitch line (viewed in axial direction), the center of gravity is displaced axially and radially. In the case of only a tangentially running pitch line, the center of gravity is displaced axially and tangentially. Apart from that, typically, a combination of these motions (radial and tangential component of the pitch line) takes place.

As shown, the invention solves the problems which are known from the art as mentioned at the beginning. A spline profile which is arranged at the circumferential external surface of the pressure disk can be omitted. Safety against slipping of the coupling contrary to the drive direction is improved, and wear or any wear induced functional impairment are reduced.

BRIEF DESCRIPTION OF THE DRAWINGS

In the following, exemplary embodiments of the invention are described by aid of the figures.

DETAILED DESCRIPTION OF PREFERRED EMBODIMENTS

Figure 1:
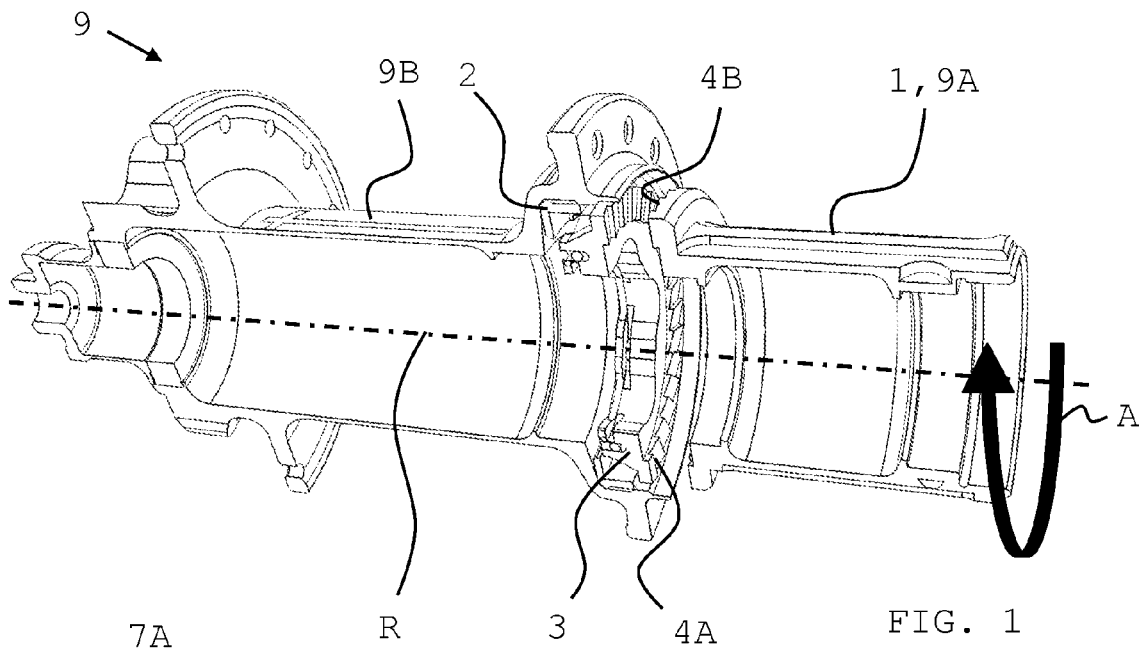
FIG. 1 shows a perspective sectional view of a torque coupling which is provided as freewheel for a wheel hub.

In FIG. 1, a perspective sectional view of a torque coupling which is provided as freewheel for a wheel hub 9 is shown. The drive body 1 which can be rotated around the rotation axis R and which is presently designed as freewheel body 9A is envisaged to receive a sprocket cluster (not shown). The latter is drivable with a chain (not shown) in drive direction A. The wheel hub 9 is depicted without bearings, spacers and the same. The output side body 2 which is arranged rotation coaxially with the drive body 1 is presently designed as screw-in ring which is firmly attached to the hub body 9B of the wheel hub 9. A pressure disk 3 is positioned rotation coaxially between drive body 1 and output side body 2, being rotation coaxially moveable in contrast to the drive and output side body 1, 2.

A first torque transmission surface 4A is arranged on that side of the pressure disc 3 which points in direction of the drive body 1. A second torque transmission surface 4B is arranged at that end of the drive body 1 which is facing the pressure disk 3. Presently, both torque transmission surfaces 4A, 4B have a spur gearing.

For the sake of better visibility, the drive body 1 is shown apart from the pressure disk 3. In the operational state, the first torque transmission surface 4A and the second torque transmission surface 4B touch each other at any time at least slipping by frictional resistance (in the freewheel case) or catching by form-closing (in the drive state), respectively.

Figure 2:
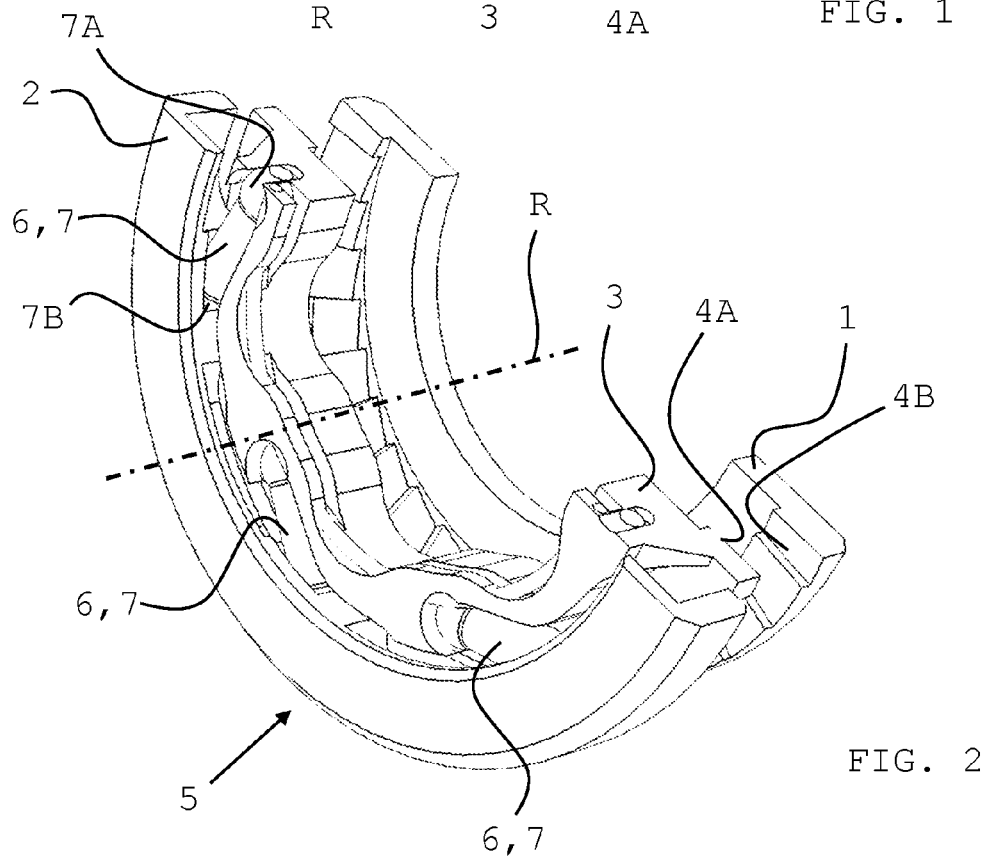
FIG. 2 shows details of the torque coupling.

In FIG. 2, details of the torque coupling from FIG. 1 are shown. Here, the perspective is diagonally as seen from the hub body 9B (not depicted). For improved visibility, the drive body 1 is shown forshortened, so that basically its second torque transmission surface 4B is recognizable.

Opposite to the latter, the first torque transmission surface 4A with the pressure disk 3 is arranged. The pressure disk 3 is not fixed in rotational axial direction. In contrast, the drive body 1 is immobile in this direction, since it is fixed by means of not depicted bearings; the same is true for the output side body 2 which is presently designed as screw-in ring in order to provide the possibility of being fixed in the hub body 9B (not shown) which is also fixed in rotational coaxial direction.

Pressure transfer elements 6 are evenly distributed between the back side of the pressure disk 3 and that side of the output side body 2 which faces the pressure disk 3. They are presently designed as push rods 7. They are designed in shape of a spherical segment at their drive side end 7A and their output side end 7B. These ends 7A, 7B rest in pockets 8A, 8B (not visible in FIG. 2), which are arranged in the back side of the pressure disk 3, or in that side of the output side body 2 which faces this back side, respectively. The push rods 7 are secured on the drive side in the pressure disk 3 by means of a snap ring against falling out.

The push rods 7 form, together with the pockets 8A, 8B, the torque transmission device 5. Since they are loaded upon rotation of the drive body 1 in drive direction A with compressive force, and since they are fixed in drive direction A, the drive torque is transferred from the back side of the pressure disk 3 via the pockets 8A, the pressure transfer elements 6 (push rods 7) and the pockets 8B onto the output side body 2, as long as the drive torque is transmitted by means of frictional resistance and/or form-closing via both torque transmission surfaces 4A, 4B. It is clear that the pressure transfer elements 6 must be designed rigid, since otherwise, the transmission of the typically high drive torque which is transferred through the pressure transfer elements 6 in form of compressive forces would not be possible.

Figure 3:
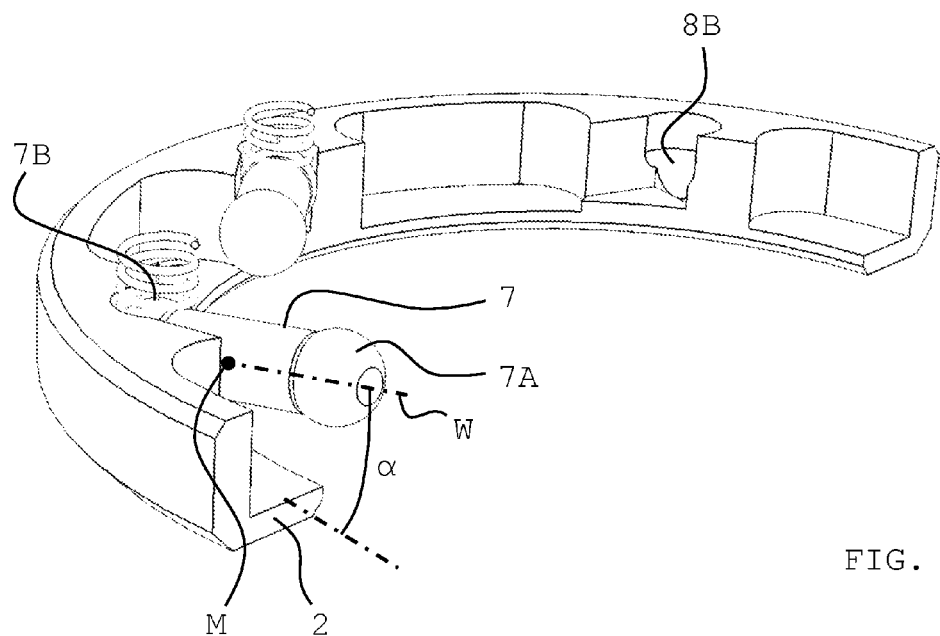
FIG. 3 shows a view of the output side body with push rods.

In FIG. 3, a sectional view of the assembly of the output side body 2 from FIG. 1, equipped with two push rods 7 (only one with reference numeral), is shown. The drive side end 7A which is spherically shaped is well visible. Accordingly shaped pockets 8B (only one with reference numeral) are arranged for the supporting reception of the output side end 7B.

Also well visible is the fact that each push rod 7 has an erecting angle $\alpha$. Presently, the same is measured between the plane of the screw-in ring and the "pitch line" W. The pitch line W is the imaginary line to which the push rod could be reduced if having an indefinitely small thickness. Also other, not depicted, differently shaped bodies, with the exception of spheres, have such a pitch line. According to the depicted embodiment, viewed in axial direction, the pitch line runs tangentially.

When the push rods 7 are compressively loaded, i.e. pushed into the pockets 8A, 8B (the latter not shown), they will try to further erect themselves due to the upwards (in direction of the non depicted pressure disk) pointing pitch line W. Thus, their center of gravity M is moved in direction of the back side of the pressure disk 3. Due to the tangential orientation (see above), an erecting of the push rod 7 will presently result not only in an axial, but also in a tangential motion of its center of gravity M. Since the push rod 7 is a rigid structure, its drive side end 7A moves accordingly further in this, but in particular, in the axial direction, while the output side end 7B remains in its joint socket in which it rotates. As a result, the push rods have in rotation axial direction, measured from the output side bodies' 2 rotation plane which is perpendicular to the rotation axis (not drawn), at any time a smaller drive side distance to this plane than an output side distance. Synonymously, the push rods have in rotational axial direction, measured from the non depicted pressure disk, at any time a smaller drive side distance than an output side distance.

As well, FIG. 3 shows several approaching means 10 designed as springs, by means of which the permanent mechanical contact of the pressure disk 3 with the drive body 1 (each not depicted) is ensured. The springs rest against the output side ends 7B of the push rods 7, so that these are pressed into the pockets 8B. In the assembled state of the torque coupling, the ends of the springs which are depicted as free ends and which point rotation coaxially upwards in the picture rest against the back side of the pressure disk 3 which permanently co-rotates with the output side body 2, the springs exerting pressure onto the pressure disk 3.

Figure 4:
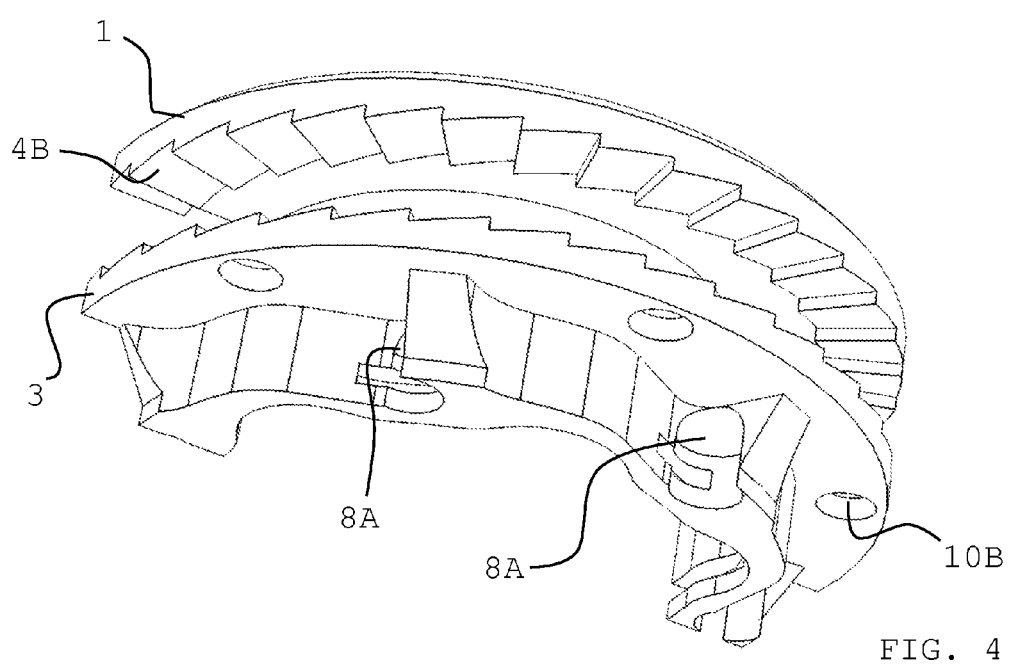
FIG. 4 shows a view of the back side of the pressure disk.

In FIG. 4, a view of the back side of the pressure disk 3 and that side of the drive body 1 which faces the pressure disk 3 with second torque transmission surface 4B is shown. Other components have been omitted for the sake of clarity; well visible are the pockets 8A which are present in the back side of the pressure disk 3 and which are adapted to the geometry of the drive side ends 7A of the push rods 7 (each not depicted). Visible are also seats 10B for the springs which are not shown in this figure (only one seat with reference numeral).

Since the pressure disk 3 does only insignificantly rotate relative to the output side body 2 upon erecting of the push rods 7, this rotation can be tolerated by the springs with no problems, without them being pulled or pushed out of the seats 10B.

Figure 5:
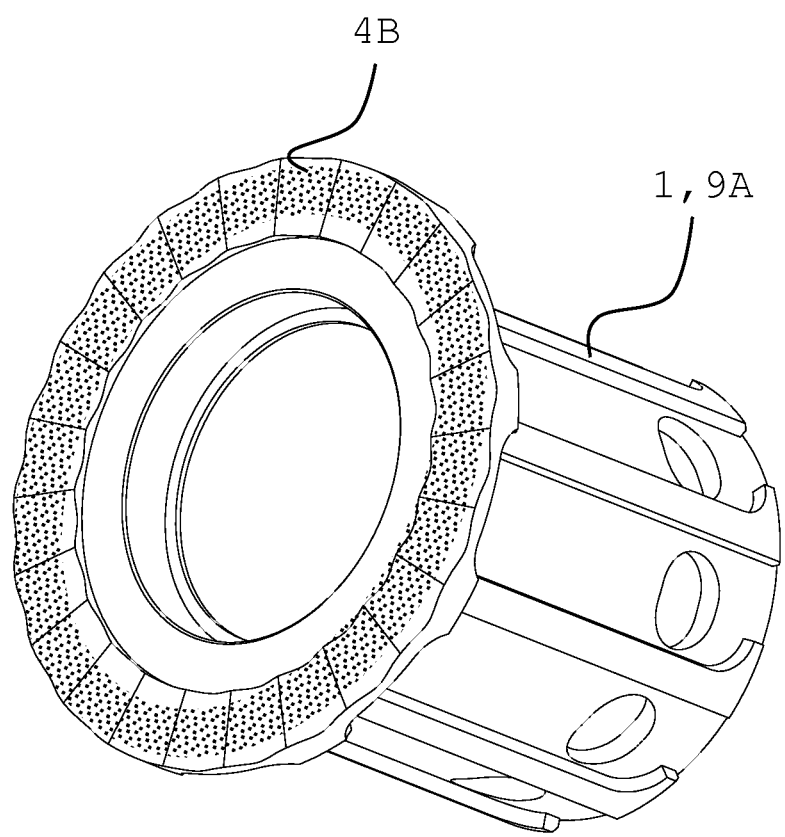
FIG. 5 shows the view of a drive body with a variant of a second torque transmission surface.

Eventually, FIG. 5 depicts a variant of a drive body, in particular with a variant of a second torque transmission surface 4B; it is clear that the same should interact with a not depicted, analogous designed first torque transmission surface 4A. The shown embodiment has a wave profile without undercuts, wherein the same is equipped with a frictionally acting surface (dotted area). Thus, the shown component is suitable for a simultaneous form-closed and/or frictional resistance torque transmission.

LIST OF REFERENCES 1 drive body
2 output side body
3 pressure disk
4A first torque transmission surface
4B second torque transmission surface
5 torque transmission device
6 pressure transfer element
7 push rod
7A drive side end
7B output side end
8A,8B pocket
9 wheel hub
9A freewheel body
9B hub body
10 approaching means
10B seat
11 recesses
A drive direction
R rotation axis
α erecting angle
W pitch line
M center of gravity

What is claimed is:

1. A unidirectional torque coupling for a wheel hub (9) of a bicycle as a freewheel for transmitting a drive torque which is provided in a drive direction (A), the torque coupling comprising:

a drive body (1) rotatable about an axis of rotation (R) to provide a drive torque, wherein the drive body (1) is immobile axially along the axis of rotation (R) during rotation;

an output side body (2) rotatable about the axis of rotation (R) and onto which the drive torque is transmissible, wherein the output side body (2) is immobile axially along the axis of rotation (R) during rotation;

a single piece pressure disk (3) able to rotate and move axially along the axis of rotation (R) during rotation, the pressure disk (3) comprising a first torque transmission surface (4A) on a face side being arranged for transmission of the drive torque;

a torque transmission device (5) which is arranged between the pressure disk (3) and the output side body (2), and by means of which the drive torque can be transferred;

wherein the drive body (1), which is opposite to the first torque transmission surface (4A), has a second torque transmission surface (4B) that remains in mechanical contact with the first torque transmission surface (4A), further wherein the first and second torque transmission surfaces (4A, 4B) are configured to grip one another by way of form-closed and/or frictional resistance, further wherein the torque transmission device (5) comprises rigid pressure transfer elements (6) that rest against a side of the pressure disk (3), which is opposite to the first torque transmission surface (4A), as well as against the output side body (2) in such a manner that the transfer elements (6) are loaded by compressive forces in a direction of the axis of rotation (R) upon gripping the first torque transmission surface (4A) by the second torque transmission surface (4B), thereby moving the transfer elements (6) contrary to the pressure disk and pressing the pressure disk (3) toward the second-torque transmission surface (4B).

2. The torque coupling according to claim 1, wherein the pressure transfer elements (6) are push rods (7) which rest with a drive side end (7A) against the pressure disk (3) and with an output side end (7B) against the output side body (2), wherein the push rods (7) are inclined at least upon compressive stress in an erecting angle (α) contrary to the drive direction (A), such that the erecting angle (α) of the push rods (7) increases upon compressive stress, pushing the pressure disk (3) in direction of the second-torque transmission surface (4B).

3. The torque coupling according to claim 2, wherein the push rods have a ball head at their drive side end (7A) and/or at their output side end (7B), and wherein the support area provided for the resting of the respective end (7A, 7B) has a suitable pocket (8A, 8B) for housing this ball head, such that the push rods (7) can be joined or are joinable in a ball joint manner with the first torque transmission surface (4A).

4. The torque coupling according to claim 1, wherein the output side body (2) is fixedly joinable with a hub body (9B) of a wheel hub (9), and/or wherein the drive body (1) is fixedly joinable with a freewheel body (9A) of a wheel hub (9).

5. The torque coupling according to claim 1, wherein the output side body (2) is a hub body (9B) of a wheel hub (9), and/or wherein the drive body (1) is a freewheel body (9A) of a wheel hub (9).

6. The torque coupling according to claim 1, wherein the first and second torque transmission surfaces (4A, 4B) are selected from the group consisting of a spur gearing with and without undercut, a symmetric and asymmetric wave profile, and a friction surface.

7. The torque coupling according to claim 1, wherein the mechanical contact of the first and second torque transmission surfaces (4A, 4B) is effected by gravity, by means of centrifugal force, by means of fluidic force, or by an approaching means (10) which uses spring force or magnetic force.

8. A method for the operation of a unidirectional torque coupling for a wheel hub (9) of a bicycle as a freewheel, the method comprising:

providing a unidirectional torque coupling having a rotatable drive body (1), a rotatable output side body (2), wherein each is immobile axially along an axis of rotation (R), a single-piece pressure disk (3) which able to move axially during rotation, and a torque transmission device (5) which is arranged between the pressure disk (3) and the output side body (2) and which comprises rigid pressure transfer elements (6), wherein in a drive case which is firstly characterized in a relative rotation between the drive body (1) and the output side body (2) in drive direction (A), the pressure transfer elements (6) are loaded by compressive forces, so that their center of gravity (M) moves contrary to a back side of the pressure disk (3), onto which they then exert pressure, resulting in a rotation and axial motion of the pressure disk (3) in direction of the drive body (1) leading to a frictional and/or form-closed connection between a first-torque transmission surface (4A) arranged at the pressure disk (3) and a second-torque transmission surface (4B) which is arranged at the drive body (1) such that the relative rotation becomes zero, and, while maintaining the compressive load, the drive torque is transmitted from the drive body (1) to the pressure disk (3), and from there, to the output side body (2), and in a freewheeling case which is characterized in a permanent relative rotation between the drive body (1) and the output side body (2) contrary to the drive direction (A), the pressure transfer elements (6) are pressure relieved, so that their center of gravity (M) moves away from the back side of the pressure disk (3), such that they do not exert pressure onto the pressure disk (3), resulting in a rotation and motion of the pressure disk (3) away from the drive body (1), resulting in a release of the connection between the first and second torque transmission surfaces (4A, 4B), so that no drive torque is transmitted from the drive body (1) to the output side body (2), but drive and output side body (1, 2) rotate freely with respect to each other; and driving the drive body (1).

9. The method according to claim 8, wherein the motion of the centers of gravity (M) of the pressure transfer elements (6) is effected in that the pressure transfer elements (6) have a longitudinal shape and are, in drive direction (A), fixed and inclined in such a manner at the back side of the pressure disk (3) as well as at the output side body (2) which is arranged opposite to this back side, so that they erect upon compressive load and require more space in rotation axial direction.

* * * * *